United States Patent
Sakurai et al.

(10) Patent No.: US 8,405,311 B2
(45) Date of Patent: Mar. 26, 2013

(54) DISCHARGE LAMP PREVENTING DEVITRIFICATION, LIGHT SOURCE DEVICE, AND PROJECTOR

(75) Inventors: Noboru Sakurai, Chino (JP); Yoshihide Nishiyama, Chino (JP)

(73) Assignee: Seiko Epson Corporation, Tokyo (JP)

( * ) Notice: Subject to any disclaimer, the term of this patent is extended or adjusted under 35 U.S.C. 154(b) by 435 days.

(21) Appl. No.: 12/685,911

(22) Filed: Jan. 12, 2010

(65) Prior Publication Data
US 2010/0201268 A1 Aug. 12, 2010

(30) Foreign Application Priority Data
Feb. 6, 2009 (JP) .................................. 2009-026363

(51) Int. Cl.
- *H01J 61/26* (2006.01)
- *H01J 7/46* (2006.01)
- *G03B 21/00* (2006.01)

(52) U.S. Cl. ........... 313/558; 313/627; 315/39; 353/122

(58) Field of Classification Search .................. 313/558, 313/627–643, 25, 26.3, 318.01–318.12
See application file for complete search history.

(56) References Cited

U.S. PATENT DOCUMENTS
| | | | |
|---|---|---|---|
| 5,461,281 A * | 10/1995 | Fromm et al. | 313/556 |
| 2001/0019454 A1 * | 9/2001 | Tadic-Galeb et al. | 359/649 |

FOREIGN PATENT DOCUMENTS
| | | |
|---|---|---|
| JP | A-8-287867 | 11/1996 |
| JP | A-2000-348672 | 12/2000 |
| JP | A-2007-317398 | 12/2007 |

OTHER PUBLICATIONS
Kira et al., Japanese Patent Application Publication 08-287867, Jan. 1996, machine_translation.*

* cited by examiner

*Primary Examiner* — Tracie Y Green
(74) *Attorney, Agent, or Firm* — Oliff & Berridge, PLC

(57) ABSTRACT

A discharge lamp includes an arc tube made of quartz glass and enclosing a light emitting substance, and an electrode mainly made of tungsten and arranged in the arc tube, the electrode including at least one getter material that binds with oxygen.

7 Claims, 5 Drawing Sheets

DISCHARGE LAMP PREVENTING DEVITRIFICATION, LIGHT SOURCE DEVICE, AND PROJECTOR

CROSS-REFERENCE TO RELATED APPLICATION

This application is based on and claims priority from Japanese Patent Application 2009-026363, filed on Feb. 6, 2009, the contents of which are incorporated herein by reference.

BACKGROUND

1. Technical Field

The present invention relates to a discharge lamp, a light source device, and a projector.

2. Related Art

Conventionally, projectors are used in a variety of application areas including image projectors for presentations in meetings and home theater systems in homes. Most of the projectors incorporate a light source device such as a discharge lamp having electrodes. For example, the discharge lamp is a halogen lamp, a metal halide lamp, or a high-pressure mercury lamp.

However, in production of the discharge lamp as above, it is known that entry of an alkali metal into an electrical discharge space inhibits electrical discharge or promotes reaction of the metal with tungsten to cause a milky clouding (devitrification) of the arc tube. Additionally, an excessive amount of oxygen in the arc tube also promotes devitrification of the arc tube. In order to solve the above problems, for example, JP-A-1996-287867 discloses a discharge lamp. The discharge lamp uses zirconium and tantalum as a getter material disposed on an electrode portion to allow the getter material to adsorb an impure gas (such as oxygen or hydrogen) generated at high temperature.

In the disclosed discharge lamp, however, the getter material is consumed at one time when the lamp is in its on state. In other words, although the getter material disposed on the electrode portion can eliminate oxygen or the like remaining in the electrical discharge space, oxygen is always supplied in the arc tube made of quartz glass ($SiO_2$) under a high temperature condition during lighting of the lamp even after consumption of the getter material. As a result, oxygen excessively supplied in the electrical discharge space causes devitrification of the arc tube. Thus, for improvement in a life span of the discharge lamp, the amount of oxygen in the electrical discharge space needs to be appropriately adjusted.

SUMMARY

An advantage of the invention is to provide a discharge lamp that allows adjustment of the amount of oxygen in an electrical discharge space to prevent devitrification of an arc tube in a long term so as to improve the life span of the discharge lamp. Other advantages of the invention are to provide a light source device and a projector including the discharge lamp and thereby achieving high reliability.

To solve the above problems, a discharge lamp according to a first aspect of the invention includes an arc tube made of quartz glass and enclosing a light emitting substance; and an electrode mainly made of tungsten and arranged in the arc tube, the electrode including at least one getter material that binds with oxygen.

The discharge lamp above includes the electrode mainly made of tungsten and including the at least one getter material binding with oxygen. This allows the getter material to be gradually discharged in an electrical discharge space, so that an amount of oxygen in the arc tube can be appropriately adjusted. Thus, devitrification of the arc tube caused by excessive oxygen can be prevented in the long term, resulting in an increase in a life span of the discharge lamp.

In addition, preferably, the getter material has a melting point equal to or higher than 2000° C.

In the discharge lamp above, since tungsten has a melting point of approximately 3400° C., using the getter material having the melting point of 2000° C. or higher allows evaporation of the getter material simultaneously with evaporation of the tungsten due to consumption of the electrode during lighting of the lamp. The evaporated getter material binds with oxygen in the arc tube, whereby the amount of oxygen in the arc tube can be appropriately adjusted.

In addition, preferably, the getter material is boron.

In the discharge lamp above, the getter material made of boron binds with oxygen remaining in the arc tube, whereby the amount of oxygen in the arc tube can be adjusted without any influence on chromaticity of the lamp or without any damage to a tube wall of the arc tube.

In addition, preferably, an amount of the getter material included in the electrode ranges from 0.5 to 100 ppm.

In the discharge lamp above, by setting the amount of the getter material included in the electrode within the above range, the amount of oxygen in the arc tube can be adjusted without any influence on chromaticity of the lamp or without any damage to the tube wall of the arc tube. Consequently, devitrification of the arc tube can be prevented in the long term.

Preferably, the amount of the getter material included in the electrode ranges from 0.5 to 30 ppm.

In the discharge lamp above, by setting the amount of the getter material included in the electrode within the above range, the amount of oxygen in the arc tube can be more appropriately adjusted without any influence on chromaticity of the lamp or without any damage to the tube wall of the arc tube. Consequently, devitrification of the arc tube can be prevented in a longer term.

A light source device according to a second aspect of the invention includes the discharge lamp of the first aspect, a microwave power source generating a microwave, and a transmission line transmitting the microwave output from the microwave power source to the arc tube.

Since the light source device includes the discharge lamp of the first aspect, the light source device can be highly reliable. Additionally, with the microwave, light emission with high luminance can be obtained on a top end of the electrode. Furthermore, since highly efficient light emission characteristics can be exhibited, there can be provided a compact and power-saving light source device.

A projector according to a third aspect of the invention includes the light source device of the second aspect, a light modulation section modulating a flux of light emitted from the light source device in accordance with input image information to form an optical image, and a projection section projecting the optical image formed by the light modulation section.

The projector includes the discharge lamp that prevents devitrification in the long term and thereby achieves the long life. Accordingly, the projector can be made highly reliable.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described with reference to the drawings. Among the drawings referred to in the description below, scales of respective constituent elements vary according to needs to make the elements visually discernible.

Light Source Device

Figure 1:
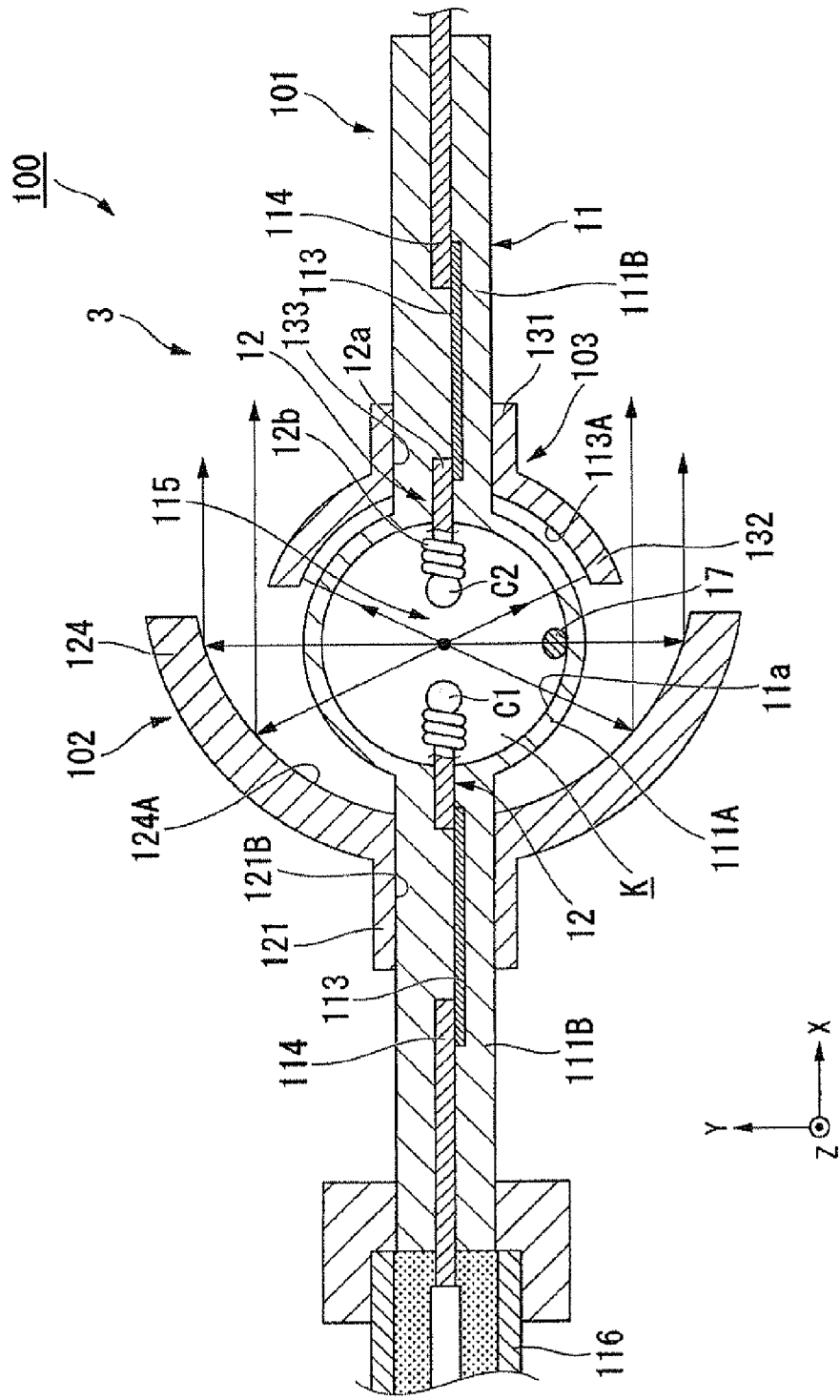
FIG. 1 is a sectional view typically showing a schematic structure of a light source device according to an embodiment of the invention.
Figure 2:
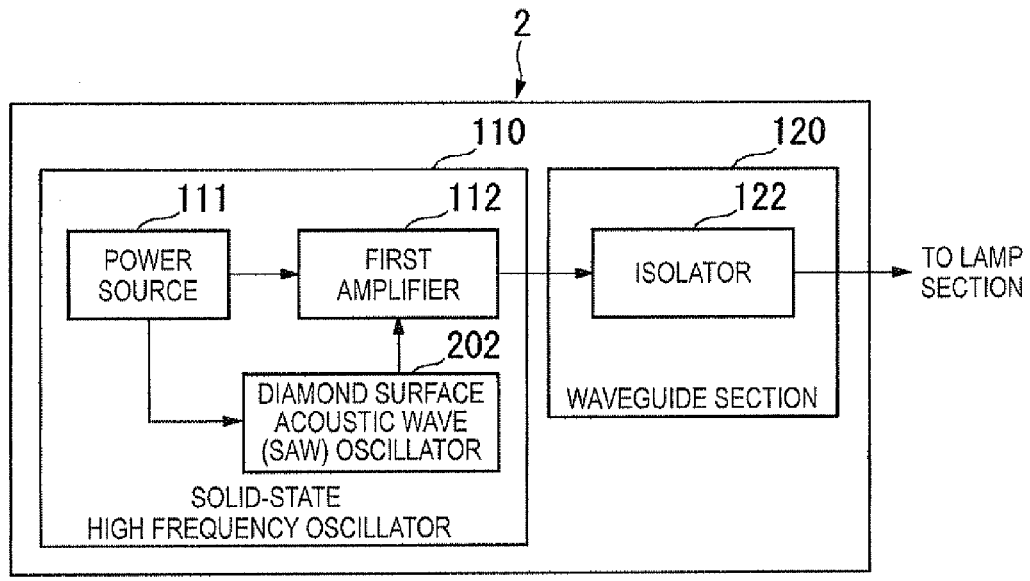
FIG. 2 is a block diagram of a microwave generating section.
Figure 3:
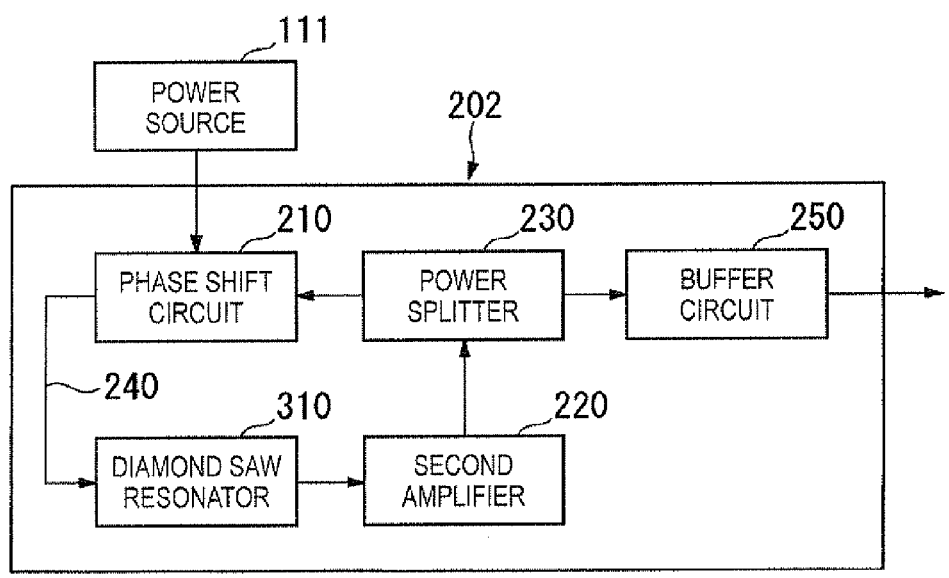
FIG. 3 is a block diagram showing a schematic structure of a solid-state high frequency oscillator.

FIG. 1 is a sectional view showing a schematic structure of a light source device according to an embodiment of the invention. FIG. 2 is a block diagram of a microwave generating section. FIG. 3 is a block diagram showing a schematic structure of a solid-state high frequency oscillator.

As shown in FIGS. 1 and 2, a light source device 100 includes a microwave generating section 2 generating a microwave and a lamp section 3 emitting light by the microwave output from the microwave generating section 2.

The lamp section 3 includes a discharge lamp 101 according to an embodiment of the invention, a reflector 102, and a sub reflection mirror 103, and is stored in a not-shown lamp housing. The reflector 102 outputs a flux of light rays emitted from the discharge lamp 101 as convergent light by orienting all directions of the light rays on a forward side of the device (in an X-axis direction shown in FIG. 1).

The discharge lamp 101 includes an arc tube 11 made of quartz glass (mainly $SiO_2$) and a pair of electrodes 12 arranged in the arc tube 11. The arc tube 11 includes a bulging portion 111A as a spherically bulging center and enclosing portions 111B extended on opposite sides of the bulging portion 111A. Inside the bulging portion 111A is formed an electrical-discharge space K having an approximately spherical shape. The pair of electrodes 12 and a light emitting substance are enclosed in the electrical-discharge space K.

The light emitting substance may be mercury, a rare gas, and a halogen compound, for example. In the embodiment, a mercury 17 is enclosed in the arc tube 11 in such a manner that the mercury 17 fixedly adheres onto an inner wall surface 11a of the arc tube 11 near a light emitting portion 115. The rare gas is used to promote light emission and is not restricted to a specific gas. For example, the rage gas may be a commonly used gas such as argon gas or xenon gas. The halogen compound may be a halogen selected among chlorine, bromine, and iodine. Among them, particularly, bromine is preferable.

Inside the respective enclosing portions 111B of the arc tube 11, respective foils 113 made of molybdenum are inserted and electrically connected to the pair of respective electrodes 12. The foils 113 are enclosed in glass or the like. The respective foils 113 are connected to respective leading wires 114 made of nickel provided as electrode leading wires.

Each of the electrodes 12 includes an electrode shaft 12a and a heat dissipating coil 12b. An end of one of the electrodes 12 opposing an end of the other one of the electrodes 12 is an electrical discharge end portion C1 (C2). Each of the electrical discharge end portions C1 and C2 is formed so as to have a spherical or domical shape with large heat capacity by thermally melting an end portion of the electrode shaft 12a by using laser. The heat dissipating coil 12b is provided by coiling a core wire as a conducting wire around the electrode shaft 12. The electrode shaft 12a and the heat dissipating coil 12b coiled around the electrode shaft 12a may be melted and combined with each other or may be fixed to each other by a coiling force of the heat dissipating coil 12b. The electrodes 12 thus structured are located apart from each other at a predetermined distance in such a manner that the electrical discharge end portions C1 and C2 face each other in the electrical discharge space K.

The electrodes 12 are mainly made of tungsten and also partially include an oxygen getter. As the material of the electrodes 12, preferably, in addition to tungsten, at least one oxygen getter is used. Particularly, it is more preferable to use, as the at least one oxygen getter, a material having a melting point close to a melting point of tungsten (3400° C.). In the present embodiment, the oxygen getter is boron having a melting point equal to or higher than approximately 2000° C. Thereby, the oxygen getter is released into the electrical discharge space K simultaneously with consumption of the tungsten during lighting of the discharge lamp 101.

An amount of the oxygen getter included in the electrodes 12 preferably ranges from 0.5 to 100 ppm, and more preferably ranges from 0.5 to 30 ppm. For example, when the amount of the oxygen getter is below 0.5 ppm, the oxygen getter cannot completely bind with oxygen remaining in the arc tube 11, so that the amount of oxygen cannot be sufficiently adjusted. Conversely, when the amount of the oxygen getter exceeds 100 ppm, a halogen cycle in the arc tube 11 is interrupted, thereby leading to blackening of the tube wall of the arc tube 11 or influence on a light emission spectrum of the lamp section 3. Therefore, setting the amount of the oxygen getter included in the electrodes 12 within the above range can prevent influence of the getter on the chromaticity of the lamp and damage to the quartz glass of the arc tube 11.

Although the embodiment uses boron as the oxygen getter, it is merely an example of the getter, and any material can be suitably used that has the melting point of 2000° C. or higher. Additionally, the amount of the oxygen getter in the embodiment is desirably selected in consideration of a weight of the light emitting substance enclosed in the arc tube 11 and the like.

The reflector 12 is an integrally molded article made of glass and includes an insertion portion 121 for inserting one of the enclosing portions 111B of the discharge lamp 101 and a reflecting portion 124 having an elliptically curved planar shape extended from the insertion portion 121. At a center of the insertion portion 121 is formed an insertion hole 121B, and the one of the enclosing portions 111B of the arc tube 11 is arranged in a center of the insertion hole 121B. The reflecting portion 124 is formed by vapor-depositing a metal thin film on a reflecting surface 124A having the elliptically curved planar shape, and serves as a cold mirror reflecting visible light and transmitting infrared light therethrough. Furthermore, preferably, a focus position of the reflecting surface 124A is made approximately coincident with a center position between the pair of electrodes 12. The shape of the reflector 102 is not restricted to the shape described above and can be changed to any other appropriate one.

The sub reflection mirror 103 is arranged opposite to the reflector 102 in such a manner that a reflecting surface 103A is oriented toward the bulging portion 111A. The sub reflection mirror 103 is an integrally molded article made of glass and includes an insertion portion 131 for inserting an other one of the enclosing portions 111B of the discharge lamp 101 and a reflecting portion 132 having an elliptically curved planar shape extended from the insertion portion 131. The sub reflection mirror 103 is a smaller reflecting member than the reflector 102. At a center of the insertion portion 131 is formed an insertion hole 133. The other one of the enclosing portions 111B of the arc tube 11 is arranged in a center of the insertion hole 133. The reflecting portion 132 is formed by vapor-depositing a metal thin film on the reflecting surface 103A having a concavely curved planar shape following a spherical surface of the electrical discharge space K and serves as a cold mirror, similarly to the reflector 102. Preferably, two focus positions of the reflecting surface 103A are made approximately coincident with positions of the electrical discharge end portions C1 and C2 of the pair of electrodes 12.

The reflecting surface 124A of the reflector 102 and the reflecting surface 103A of the sub reflection mirror 103 may be spherical surfaces instead of the elliptically curved surfaces.

When fixing the discharge lamp 101 to the reflector 102 and the sub reflection mirror 103, respectively, an inorganic adhesive is filled in the insertion hole 121B and the insertion hole 133, respectively, to fix the pair of enclosing portions 111B of the discharge lamp 101 to the reflector 102 and the sub reflection mirror 103, respectively, in such a manner that the enclosing portions 111B are horizontally arranged.

As shown in FIG. 2, the microwave generating section 2 includes a solid-state high frequency oscillator 110 outputting a high frequency signal and a waveguide section 120 outputting, as a microwave, the high frequency signal from the solid-state high frequency oscillator 110.

The solid-state high frequency oscillator 110 includes a power source 111, a diamond SAW oscillator 202 as a surface acoustic wave (SAW) oscillator, and a first amplifier 112 serving as an amplifier. The waveguide section 120 includes an isolator 122 as a cutout switch and a coaxial cable 116 (see FIG. 1) connecting the isolator 122 to the lamp section 3 shown in FIG. 1.

The power source 111 supplies power to the diamond SAW oscillator 202 and the first amplifier 112. The first amplifier 112 is connected to a rear stage of the diamond SAW oscillator 202, whereby a high frequency signal output from the diamond SAW oscillator 202 is amplified by the first amplifier 112 to be output. The high frequency signal output from the first amplifier 112 corresponds to the high frequency signal output from the solid-state high frequency oscillator 110. In the present embodiment, the solid-state high frequency oscillator 110 outputs a high frequency signal of 2.45 GHz amplified up to a high frequency output level allowing the light emitting substance enclosed in the arc tube 11 of the discharge lamp 101 to be excited to emit light.

The waveguide section 120 guides the high frequency signal output from the solid-state high frequency oscillator 110 to output the signal as a microwave. The waveguide section 120, which includes the isolator 122 to prevent a reflected wave, transmits the microwave to the lamp section 3 via the coaxial cable 116 (see FIG. 1) extended from the isolator 122.

The isolator 122 inhibits a reflected wave from the lamp section 3 as a target object from returning to the solid-state high frequency oscillator 110 to prevent a breakdown of the first amplifier 112 or the like caused by the reflected wave.

As shown in FIG. 3, in the diamond SAW oscillator 202, there is formed a loop circuit 240 including a phase shift circuit 210, a diamond SAW resonator 310, a second amplifier 220, and a power splitter 230, as well as a buffer circuit 250 is connected to an output terminal of the power splitter 230.

The phase shift circuit 210 shifts a phase of the loop circuit 240 by using a control voltage input from the power source 111. Characteristic impedances of those respective blocks are matched to a predetermined impedance value, for example, 50 ohms to connect the blocks to each other. The diamond SAW resonator 310 can be connected to an input terminal of the second amplifier 220 to supply an input voltage saturating the second amplifier 220.

Thereby, using the diamond SAW resonator 310 allows direct oscillation of a high frequency signal in GHz band. In addition, while maintaining the impedance matching, an output power of the second amplifier 220 can be externally output from the power splitter 230 via the buffer circuit 250.

With the above circuit structure, continuous oscillation can be maintained with minimum power applied to the diamond SAW resonator 310. Additionally, using the phase shift circuit 210 allows frequency modulation of the high frequency signal, whereby a microwave frequency can be changed so as to be adjustable for the arc tube 11.

The phase shift circuit 210 may not be used. In this case, the solid-state high frequency oscillator 110 serves as a fixed oscillator oscillating at a frequency uniquely determined by characteristics of the diamond SAW resonator 310.

In the light source device 100 of the embodiment, a microwave supplied to the lamp section 3 by driving the microwave generating section 2 causes excitation and ionization of the light emitting substance enclosed in the electrical discharge space K of the arc tube 11 to achieve plasma light emission. This leads to formation of the light emitting portion 115 between the electrodes 12, and then, a light flux of the light emitting portion 115 is emitted outside the arc tube 11. A part of the light flux emitted from the bulging portion 111A is transmitted through the arc tube 11 to be input to the sub reflection mirror 103, then reflected by the reflecting surface 103A of the mirror 103 to be returned to the bulging portion 111A again. A part of the returned light travels to the reflector 102. The light input to the reflector 102 is reflected by the reflecting surface 124A of the reflecting portion 124 to be emitted in a predetermined direction. When the discharge lamp 101 is lighted on, the light flux emitted from the bulging portion 111A is directed as an approximately collimated light beam in the predetermined direction by the reflector 102 and the sub reflection mirror 103.

During lighting of the discharge lamp 101, heat generated by an arc between the electrodes 12 has a high temperature of approximately 3500° C. A softening temperature of quartz glass is approximately 1500° C. Accordingly, when the arc tube 11 becomes at high temperature due to the heat generated by the arc, a part of the quartz glass ($SiO_2$) evaporates, and then, the evaporated $SiO_2$ is decomposed into Si and O. Thereby, oxygen is constantly supplied in the electrical discharge space K during lighting of the discharge lamp 101. It is known that, as an oxygen concentration in the closed space K gradually increases, a milky clouding (crystallization) of the arc tube 11 is promoted, resulting in devitrification of the arc tube 11 in a short time.

Therefore, in order to adjust an amount of oxygen in the electrical discharge space K as a factor causing the devitrification of the arc tube 11, the electrodes 12 in the discharge lamp 101 of the embodiment include the oxygen getter. When the discharge lamp 101 is in its on state, the electrodes 12 are evaporated (consumed) due to the heat generated by the arc, whereby boron as the oxygen getter is released in the electrical discharge space K. The oxygen getter released simultaneously with consumption of the electrodes 12 binds with excessive oxygen present in the arc tube 11, such as oxygen remaining in the electrical discharge space K and oxygen decomposed from the quartz glass ($SiO_2$) included in the material of the arc tube 11, thereby adjusting the amount of oxygen in the electrical discharge space K to a certain amount. The boron binding with the oxygen is adsorbed together with tungsten evaporating and repeating a halogen cycle onto a part of the electrode shafts 12a, and thus there is no influence on light emission.

In addition, during lighting of the lamp 101, the electrodes 12 are slowly consumed. Thus, the amount of oxygen in the electrical discharge space K is suppressed over a long period of time, so that the devitrification (milky clouding) of the arc tube 11 is prevented in the long term.

In the embodiment, the amount of the oxygen getter in the electrodes 12 is in the range of 0.5 to 100 ppm. If the amount of the included oxygen getter is too small, it is impossible to achieve complete binding between the oxygen getter and the excessive oxygen in the electrical discharge space K. Conversely, if the amount of the oxygen getter is too large, the oxygen getter becomes a compound and adheres onto the inner wall surface 11a of the arc tube 11 to cause blackening of the wall surface 11a or the like, which has influence on luminance of light emission. For this reason, by setting the amount of the oxygen getter in the electrodes 12 to the above range, the amount of oxygen in the arc tube 11 can be adjusted without causing any influence on chromaticity of light emission of the lamp section 3 or without causing any damage to the tube wall of the arc tube 11. As a result, the light source device 100 can achieve high luminance and a long life and thus can be made suitable as a light source system for a projector according to an embodiment of the invention, which will be described later.

TEST EXAMPLE 1

Figure 4A:
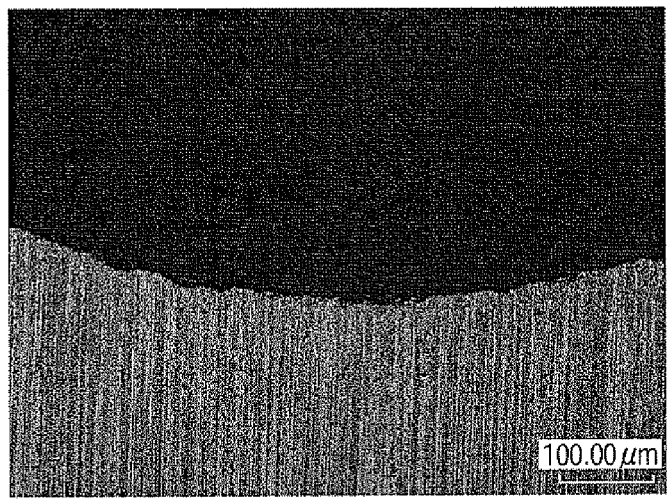
FIGS. 4A, 4B, and 4C are micrographs showing conditions of devitrification in an arc tube after devitrification tests.
Figure 4B:
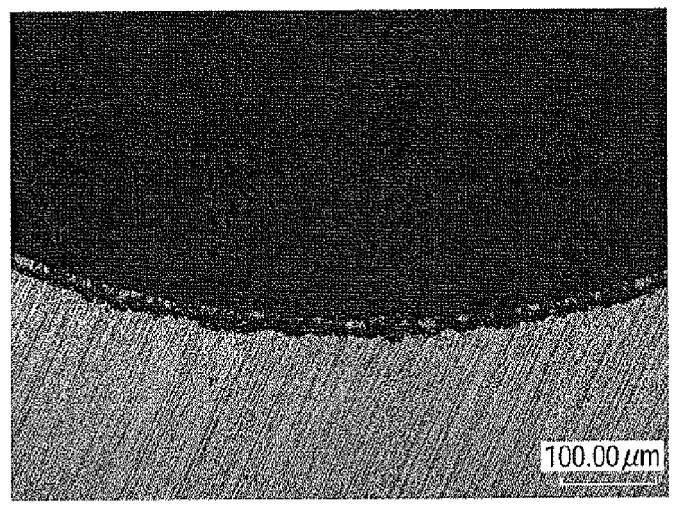
Figure 4C:
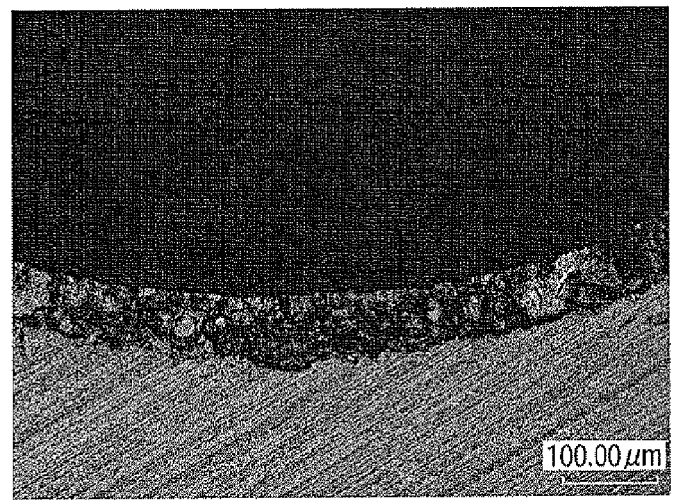

Next, devitrification tests of the discharge lamp were performed to clarify the advantageous effects of the embodiment of the invention. FIGS. 4A to 4C are sectional views shown by enlarging a part of a section of the arc tube (the bulging portion) after the tests. FIG. 4A shows examples 1 to 4, FIG. 4B shows example 5, and FIG. 4C shows example 6.

For the respective test examples 1 to 6, there were prepared respective discharge lamps as the discharge lamp structured shown in FIG. 1 and including different amounts of boron in the electrodes. The respective lamps were heated for a predetermined time in an oven to observe a presence or an absence of devitrification in the arc tube. The heating process using the oven was performed at 1300° C. for two hours.

TABLE 1

Devitrification Tests

| | Amount of boron included (ppm.) | Presence of devitrification |
|---|---|---|
| Example 1 | 0.7 | None |
| Example 2 | 2.5 | None |
| Example 3 | 25 | None |
| Example 4 | 50 | None |
| Example 5 | 130 | Slightly observed |
| Example 6 | 10000 | Significantly observed |

*Heating temperature was 1300° C.

Table 1 shows results of the test examples 1 to 6. In Table 1, there are presented amounts of boron included in the electrodes and the presence or the absence of devitrification of the arc tube. Devitrification evaluations were indicated by "none", "slightly observed", and "significantly observed".

In the test results, as shown in FIG. 4A, no devitrification was observed when the amount of boron included in the electrodes was small (a range of 0.1 to 50 ppm) in the examples 1 to 4.

In addition, in the example 5 where the amount of boron in the electrodes was 130 ppm, crystallization of a part of the tube wall of the arc tube 11 was observed, as shown in FIG. 4B, resulting in formation of a devitrification layer 13 having a thickness of a few micrometers.

Furthermore, in the example 6 where the amount of boron in the electrodes was 10000 ppm, the thickness of the devitrification layer 13 was found to be equal to or larger than five times the thickness in the example 5, thus resulting in a few tens of micrometers in size, as shown in FIG. 4C. In this case, it was conceivable that an excessive amount of the oxygen getter as an impurity adhered onto the tube wall of the arc tube 11.

Figure 5A:
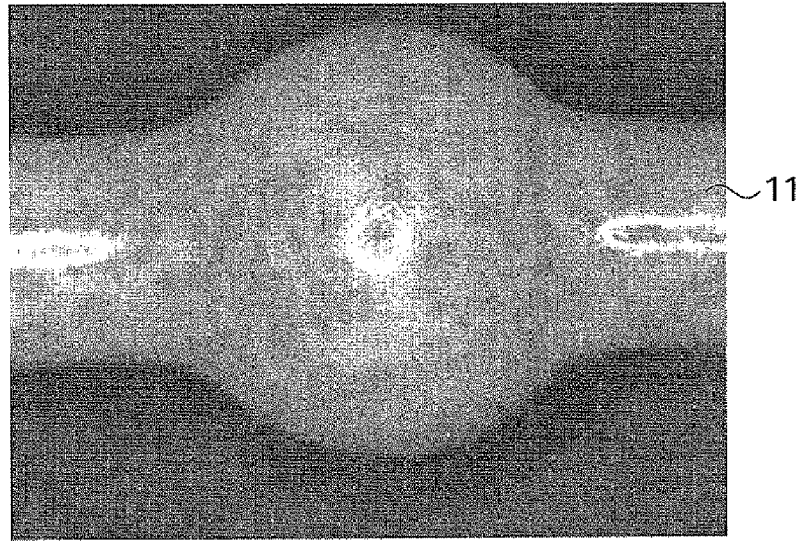
FIGS. 5A and 5B are sectional views showing a presence or an absence of devitrification in the arc tube after the devitrification tests.
Figure 5B:
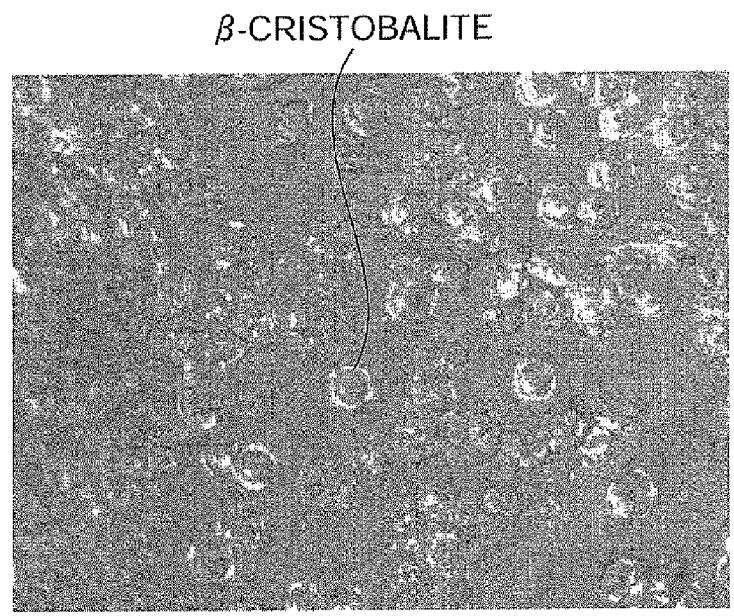

FIGS. 5A and 5B show devitrification of the arc tube observed after the tests.

FIG. 5A is a plan view showing a post-test appearance of the arc tube. FIG. 5B is an enlarged view of β-cristobalite as a starting point of devitrification.

It was observed that crystallization of quartz glass started with formation of a heterogeneous nucleus as shown in FIG. 5B, namely formation of cristobalite (β-cristobalite), and then, distribution of cristobalite caused a milky clouding, which grew on an entire part of the arc tube 11.

The results as above show that inclusion of a large amount of the oxygen getter in the electrodes 12 is not always favorable. If the amount of boron in the electrodes 12 becomes excessive, the excessive amount of boron turns to be the impurity adhering, together with tungsten, onto the inner wall surface 11a of the arc tube 11 and promoting devitrification (crystallization). It is also shown that setting the amount of the oxygen getter in the electrodes 12 within a range of 0.7 to 50 ppm allows devitrification of the arc tube 11 to be effectively prevented.

The results were obtained under the test conditions described above. However, desirably, the amount of the oxygen getter in the electrodes 12 is appropriately determined depending on the heating process temperature (an output power of the lamp), the kind of the light emitting substance, or the like.

Projector

Next will be described a projector according to an embodiment of the invention. The projector includes the light source device of the embodiment.

Figure 6:
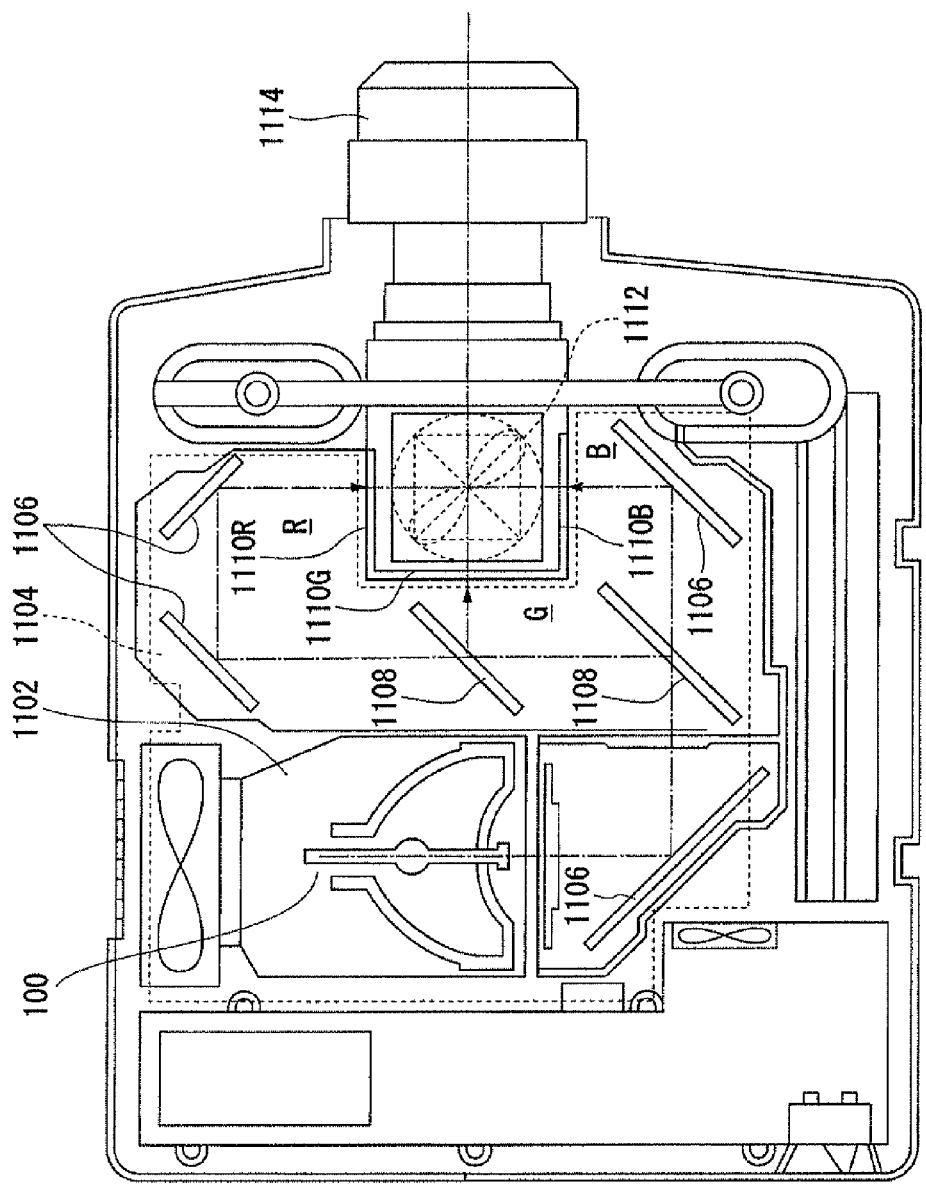
FIG. 6 is a schematic structural view of a projector according to an embodiment of the invention.

FIG. 6 is a plan view showing a structural example of the projector. As shown in the drawing, inside the projector 1100 is provided a lamp unit 1102 including the light source device 100 of the above-described embodiment. Projection light emitted from the lamp unit 1102 is split into light rays of three primary colors of red (R), green (G), and blue (B) by four mirrors 1106 and two dichroic mirrors 1108 arranged in a light guide 1104 to be input to respective liquid crystal panels (light modulation sections) 1110R, 1110B, and 1110G as light valves corresponding to the respective primary colors.

The liquid crystal panels 1110R, 1110B, and 1110G have a same structure as that of the liquid crystal device described above and are driven by signals of the primary colors R, G, and B supplied from an image signal processing circuit. Light rays modulated by the liquid crystal panels are input to a dichroic prism 1112 from three directions. In the dichroic prism 1112, light rays of red and blue are refracted at an angle of 90 degrees, whereas a green light ray travels straight.

Consequently, images of the respective colors are synthesized, resulting that a color image is projected on a screen or the like via a projection lens 1114 (a projection section). Regarding display images provided by the liquid crystal panels 1110R, 1110B, and 1110G, the display image by the liquid crystal panel 1110G needs to be laterally reversed with respect to the display images by the liquid crystal panels 1110R and 1110B.

The projector 1100 includes the light source device 100 of the above-described embodiment. In the light source device 100, devitrification of the arc tube 11 is prevented in the long term, and thus, application of illumination light with high luminance can be achieved in the long term. Accordingly, the projector 1100 has a long life and can provide projection images having high display quality and high reliability. Additionally, the projector 1100 including the compact light source device 100 can be entirely miniaturized and can be made light-weighted.

Furthermore, in the projector 1100 of the embodiment, the liquid crystal panels are used as the light modulation sections. However, instead of the liquid crystal panels, in general, any device modulating incident light in accordance with image information can be used. For example, there may be used a micro-mirror type light modulation device, such as a digital micro-mirror device (DMD: a registered trademark). If the micro-mirror type light modulation device is used, there are no needs for an incident light polarizing plate or an output light polarizing plate. Thus, no polarization conversion element is necessary.

The light source device 100 of the embodiment is applied to the projector 1100 of a transmissive liquid crystal system. However, instead of that, the light source device 100 can also be applied to a projector employing a reflective liquid crystal system, such as a liquid-crystal-on-silicon (LCOS) system, so as to obtain same advantageous effects.

In addition, in the embodiment, the light source device 100 is applied to a front-type projector projecting an optical image on a projecting surface arranged outside the projector. However, alternatively, the light source device 100 may be applied to a rear-type projector having a screen thereinside to project an optical image on the screen inside the projector.

In addition, the projector 1100 of the embodiment may include a voltage adjustment section to adjust a degree of amplification of the first amplifier 112 in the solid-state high frequency oscillator 110. The structure allows adjustment of microwave output power, so that luminance of a flux of emitted light in the arc tube 11 can be changed. Accordingly, by adjusting the amplification degree in accordance with a scene of a projection image (such as a bright or dark scene), luminance of image light projected by the projector 1100 can be adjusted in accordance with the scene of the image.

While some preferred embodiments of the invention have been described with reference to the accompanying drawings, it should be understood that the invention is not intended to be limited to those embodiments, and for example, the embodiments may be combined together. It will be obvious to those skilled in the art that various changes and modifications can be made therein without departing from the scope of technological ideas described in the claims of the invention, and those changes and modifications are naturally included in the technological range of the invention.

For example, in the light source device 100 of the embodiment, the solid-state high frequency oscillator 110 outputs the high frequency signal of 2.45 GHz and the high frequency signal is emitted as a microwave from the electrodes 12. However, instead of that, by changing the structure of the acoustic surface wave resonator according to needs, various high frequency signals can be output and emitted as microwaves to cause light emission by the arc tube 11. Moreover, in this manner, it is also possible to emit a microwave in accordance with the kind of the light emitting substance enclosed in the arc tube 11 and the condition of light emission (the condition of a light emission color).

Additionally, the compact and light-weighted light source device 100 of the embodiment can be applied not only to the light source of the projector but also to other optical apparatuses. Furthermore, the light source device 100 can also be suitably applied to lighting apparatuses in aircraft, ships, vehicles and the like, indoor lighting apparatuses, or the like.

What is claimed is:

1. A discharge lamp, comprising:
    an arc tube made of quartz glass and enclosing a light emitting substance; and
    an electrode arranged in the arc tube, the electrode composed of a mixture mainly containing tungsten and at least one getter material that binds with oxygen.

2. The discharge lamp according to claim 1, wherein the getter material has a melting point equal to or higher than 2000° C.

3. The discharge lamp according to claim 1, wherein the getter material is boron.

4. The discharge lamp according to claim 1, wherein an amount of the getter material included in the electrode ranges from 0.5 to 100 ppm.

5. The discharge lamp according to claim 4, wherein the amount of the getter material included in the electrode ranges from 0.5 to 30 ppm.

6. A light source device including the discharge lamp of claim 1, a microwave power source generating a microwave, and a transmission line transmitting the microwave output from the microwave power source to the arc tube.

7. A projector including the light source device of claim 6, a light modulation section modulating a flux of light emitted from the light source device in accordance with input image information to form an optical image, and a projection section projecting the optical image formed by the light modulation section.

* * * * *